UNITED STATES PATENT OFFICE.

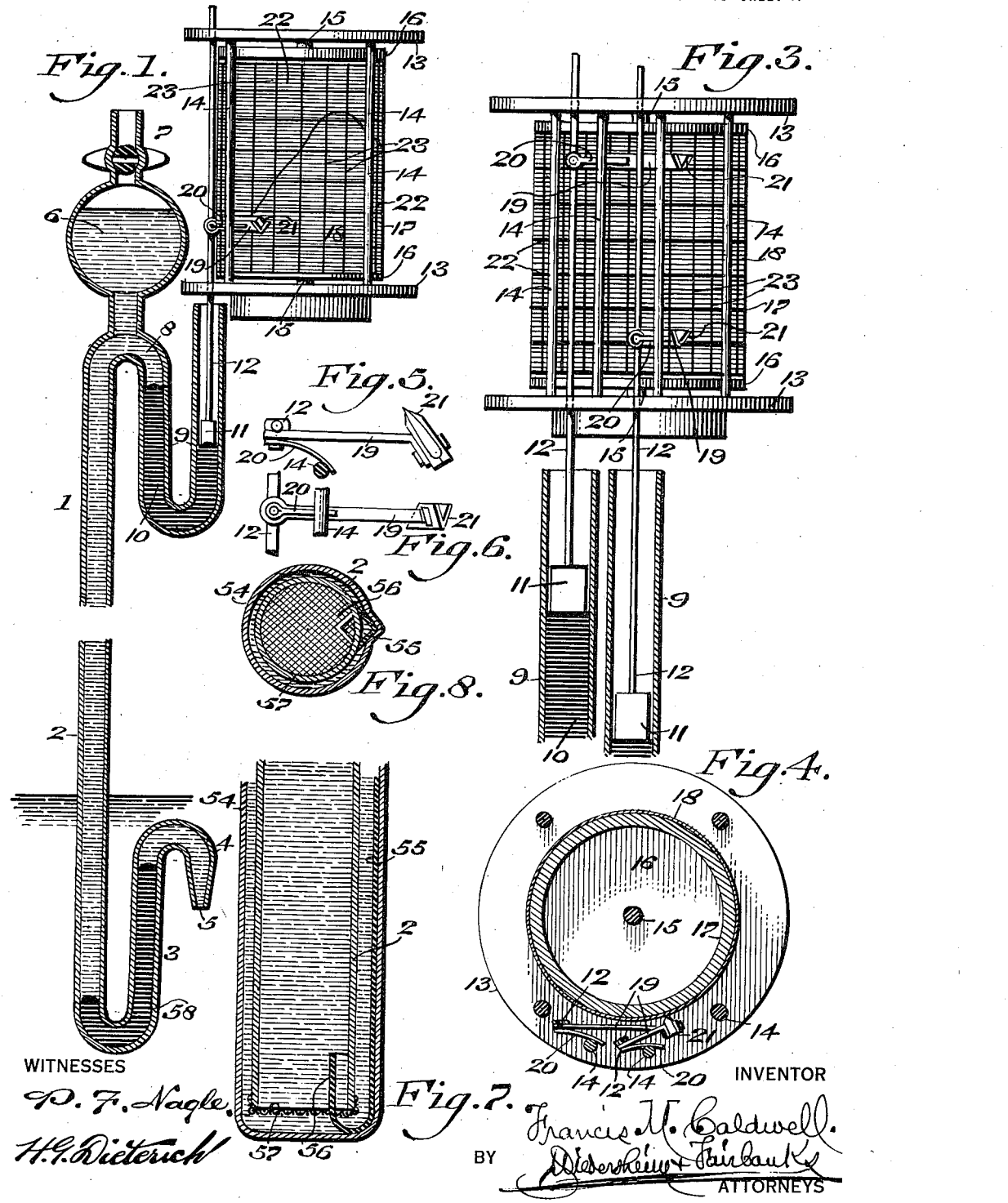

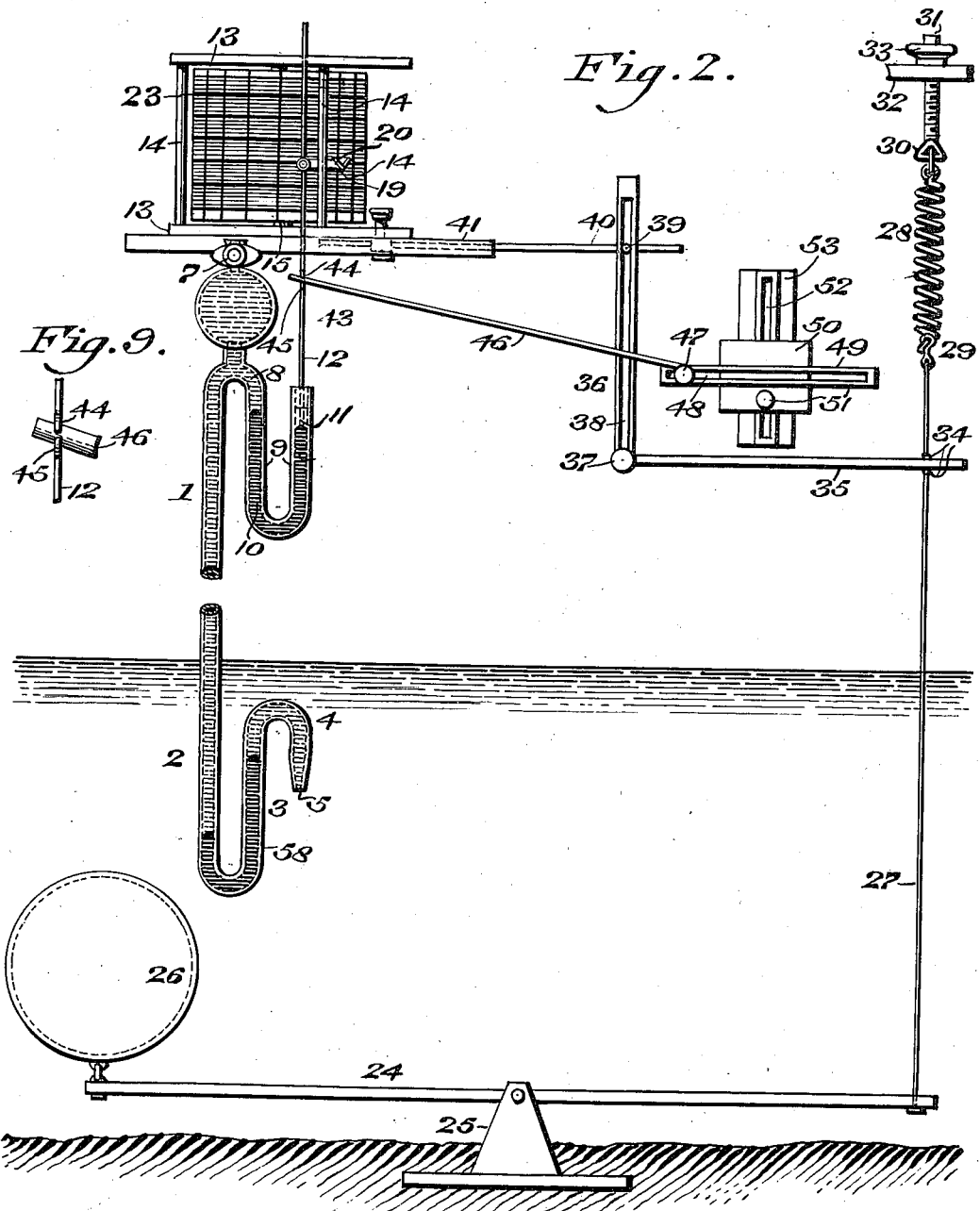

FRANCIS M. CALDWELL, OF PHILADELPHIA, PENNSYLVANIA.

INSTRUMENT FOR RECORDING WATER-LEVELS.

1,179,695.  Specification of Letters Patent.  Patented Apr. 18, 1916.

Application filed May 10, 1915. Serial No. 26,935.

*To all whom it may concern:*

Be it known that I, FRANCIS M. CALDWELL, a citizen of the United States, residing in the city and county of Philadelphia, State of Pennsylvania, have invented a new and useful Instrument for Recording Water-Levels, of which the following is a specification.

My invention consists of apparatus for registering variations in the level of a body of water or other liquid, such as flood and ebb of the ocean or other large body of water, changes in level in dams and tail-races of water-power apparatus, and thus recording changes in the elevation or receding of the bodies of water.

It further consists of means in such apparatus for adapting its elements to record variations in liquids of different specific gravity, such as salt-water, fresh water, and other liquids of varying specific gravity.

It further consists of means for reducing the movements of the level of the liquid body to a size which can be recorded upon a comparatively short space, so that the record marks can be of such size as to require small space upon the record upon the drum while the proportions of lengths of the rise and fall of the level of the liquid is considerable.

It further consists of other novel features of construction, all as will be hereinafter fully set forth.

The annexed drawings and the following description set forth in detail one mechanical form embodying the invention, such detail construction being but one of various mechanical forms in which the principle of the invention may be used.

In said annexed drawings—Figure 1 represents a partly diagrammatical and partly sectional view of an apparatus for registering liquid levels, head and tail levels, of water-power plants or other bodies of water or other liquids in which changeable levels or heads of the liquid are required to be recorded. Fig. 2 represents a similar diagrammatical and partly sectional view of another form of embodiment of the apparatus. Fig. 3 represents an enlarged view of the recording device. Fig. 4 represents a horizontal section of the recording drum. Figs. 5 and 6, respectively represent a plan view and a front view of the means for recording lines on the drum and chart. Figs. 7 and 8 respectively, represent an axial section and a horizontal section of one form of the immersed portion of the transmitting tube. Fig. 9 represents a detail view of the rod connecting the recording device and float.

Similar numerals of reference indicate corresponding parts in the figures.

Referring to the drawings, the apparatus is provided with a tube, 1, preferably of glass, although it may be of any other material, such as non-corrosive metal or portions of glass and portions of metal, has a main-portion, 2, which is immersed in the body of water and a lower U-shaped portion, 3, having its end, 4, curved downward and either of the same diameter as the U-shaped portion or tapering downward with an opening, 5, at its point. A quantity of mercury, 58, is confined in this lower U-shaped portion of the tube. A bulb, 6, is at the upper end of the main tube, and has a valve, 7, by means of which air can be let out of the main-tube and the bulb to fill the same with the water into which it is immersed. A laterally and downwardly curved branch-tube, 8, extends from the upper end of the main-tube and continues in a U-shaped portion, 9, having its upper end open. A quantity, 10, of mercury is filled through the open end of the upper U-shaped tube-portion and extends to near the connection with the main-tube. A float, 11, is supported upon the end of the mercury-column and has a vertical rod, 12, secured to its upper side and extending upward through the open end of the U-shaped upper portion of the tube. Two circular heads, 13, are spaced from each other by bars, 14, and have central bearings in which trunnions, 15, upon the heads, 16, of a drum, 17, are journaled. A peripherally and vertically ruled chart, 18, is removably secured around the drum, and an arm, 19, is secured at one end to the float-rod and has a pen or pencil, 21, supported in its end which is in contact with the chart and is held in such contact by a spring, 20, secured to the arm and bearing against one of the bars securing the heads, to force the arm and its pen or pencil against the chart and drum to cause it to mark a peripheral line upon the former, when the drum is rotated by a suitable clockwork or similar motor within the same. Two inscribing pens, arms and vertically movable rods are sometimes employed, one to record the high levels or heads of the water and one the low levels or tails, and the arms are of such length that their pens are vertically alined. The peripheral lines, 22, on the chart indicate the rise and fall of the water-levels, and the vertical lines, 23, indicate the divisions of time at which the rise or fall of the water-levels occur.

In the apparatus illustrated in Fig. 2, the tube has as much of its length as will remain immersed in the water at its several stages, of the same construction as the U-shaped portion shown in Fig. 1, although the immersed end of the tube in either form may be straight and open, and without the U-shaped formation and mercury filling of the tube. As, however, the greater quantity of mercury is used, the resistance of the liquid in the tube will increase and its rise and fall in the same will be respectively less and more. A lever, 24, is illustrated as fulcrumed in a bracket, 25, upon the bottom of the body of water to be recorded, or sufficiently deep in such body to be at all times immersed, and a float, 26, is movably connected to one arm of said lever. A rod, 27, is movably connected to the other arm of this lever, and extends upward above the water-level and about on the level with the recording device, and the upper end of said rod is secured to a coiled spring, 28, by a movable link, 29, while the upper end of such spring is movably connected to a loop, 30, at the lower end of a screw, 31, passing through a support, 32, and having a nut, 33, bearing against the upper side of said support to adjust the tension of the spring. Two buttons, 34, are adjustably secured upon the rod to connect the latter to an arm, 35, through an opening in which the rod is carried and which engage the arm from below and above to move such arm by the rod from the lever. The arm 35 forms one arm of a bell-crank, having an upright arm, 36, and fulcrumed at a fixed point 37. The upright arm has a longitudinal slot, 38, in which a bolt, 39, is movable, which bolt is secured in a bar, 40, adjustably secured to the lower head of the drum-frame and slidable in a rigidly supported guide, 41. The float rod 42 which carries the pen or marker, is in this form of recorder formed in two pieces, one, 42, being the part carrying the pen and the lower part, 43, being that secured to the float. The ends of the rod-sections have heads, 44 and 45, which respectively slidably engage the upper and lower side of a bar, 46, which has one end secured by a set-screw, 47, adjustable in a slot, 48, in a horizontal bar, 49, upon a plate, 50, vertically adjustable by a set-screw, 51, in a slot, 52, formed in a plate, 53, rigidly secured to a vertical surface.

In Figs. 7 and 8 is illustrated a form of apparatus in which the main tube contains fresh water and mercury at the upper U-shaped end, and such fresh water is employed within the main tube and will rise and fall and operate the recording elements whether the surrounding water, whose levels are recorded, is fresh or more or less salt. The lower end of the main tube has no U-shaped portion, but is straight and open. A bag, 54, with closed lower end and made from expansive and contractible material, such as rubber or similar material, is drawn over the lower end of the tube and is of a normally larger diameter than the latter to form an annular space filled with fresh water. The bag or cover extends upward upon the tube, above the maximum level of the surrounding water, so that said water will not overflow into the bag over the upper edge of the same. A strip, 55, of metal or other material which will not be affected by the water and bent transversely to be V-shaped or arcuate in transverse section, is inserted between the bag and tube, and a vertical channel will be produced on one side of the tube, which will prevent the bag from being pressed by the outside water and tighten the bag against the tube, but maintain a water space around the tube, between the latter and the bag. The lower end, 56, of the channel is bent inward and upward around the lower edge of the tube to maintain free communication between the water in the space between the tube and bag and the interior of the tube. A screen, 57, of wire-cloth or otherwise foraminated fabric is tightly secured over the lower open end of the tube to screen impurities following the water in the space between the tube and bag, and to prevent the end of the bag from being forced into and close the open end of the tube.

The recording apparatus for recording the changing levels of bodies of water at the dam and tail race of a water-power apparatus, the changes of ebb and flood of an ocean or a contributary stream to a body of water affected by rising and receding water, and certain constructions of the apparatus can have the high and low level-recording elements at a central station point, with separate connections between the same and the transmitters or tubes having movement imparted to their liquid contents.

In practice, the lower end of the tube is immersed and secured in the body of water the level of which rises and falls. If the water-level rises, the pressure above increases and raises the water and the mercury body or bodies in the tube. The float in the open branch of the upper U-shaped mercury-containing portion rises and falls with the exposed surface of the mercury, and raises and lowers the pen-carrying rod which draws a waved peripheral line upon the chart and, by the horizontal travel, indicates the time, and by the vertical motions indicates the liquid level at such time. When the apparatus operates one tube, drum and chart, and pen-carrier, such apparatus only records the changes of water-levels from one point, such as the level at the dam, or the level of the tail, but a greater number of records can be drawn by employing two or more tubes and pens, which latter are arranged in a vertical alinement, to get the several simultaneous records of rises or falls of the plurality of pens in the same vertical rows of the charts. The times when waves are formed on the peripheries of the several vertical spaces of the chart from their respective apparatus, are adjusted so that the marks in each vertical column are synchronous.

In the apparatus illustrated in Fig. 2, the float 26 will rise or sink according to the salt contents in the water, and through the levers and spring slide the recording drum, to have the pen and its rod moved to one or the other side of the rod 12 to automatically correct the rise or fall of the rod and pen in its relation to the chart according to the degree of salt in the liquid having its rise and fall recorded.

The drum and chart may be made of any convenient dimensions so that the record may be taken at longer or shorter intervals according to demands.

Other modes of applying the principle of my invention may be employed for the mode herein explained. Change may therefore be made as regards the mechanism thus disclosed, provided the principles of construction set forth, respectively, in the following claims are employed.

Having thus described my invention what I claim as new and desire to secure by Letters Patent, is:—

1. Apparatus for registering variation in the level of bodies of liquid, which consists of a tube having a U-shaped lower end with an opening and adapted to have its open lower end immersed in said body of liquid and formed with a U-shaped upper portion having an open end and said tube adapted to be filled with the liquid to have its levels registered and with a charge of mercury in the U-shaped portion, a float upon the exposed end of such charge, a rod secured at one end to said float and extending through the open end of the U-shaped tube-portion, and a registering device connected to said rod.

2. Apparatus for registering variation in the level of bodies of liquid, which consists of a tube having a U-shaped lower end with an opening and adapted to have its open lower end immersed in said body of liquid and formed with a U-shaped upper portion having an open end and said tube adapted to be filled with the liquid to have its levels registered and with a charge of mercury in the U-shaped portion, a float upon the exposed end of such charge, a rod secured at one end to said float and extending through the open end of the U-shaped tube-portion, a writing device connected to said rod, and a traveling record chart engaged by said device.

3. Apparatus for registering variation in the level of bodies of liquid, which consists of a tube having a U-shaped lower end with an opening and adapted to have its open lower end immersed in said body of liquid and formed with a U-shaped upper portion having an open end and said tube adapted to be filled with the liquid to have its levels registered and with a charge of mercury in the U-shaped portion, a float upon the exposed end of such charge, a rod secured at one end to said float and extending through the open end of the U-shaped tube-portion, a writing device connected to said rod, and a record chart having means for moving it in its relation to said writing device to be marked by the same.

4. Apparatus for registering variation in the level of bodies of liquid, which consists of a main tube having a U-shaped lower end with an opening and adapted to have its lower portion adapted to be immersed in said body of liquid and having said portion formed in a U-shaped form and terminating in a downwardly-curved open-ended extremity, said U-shaped tube-portion being adapted to contain mercury, a U-shaped tube-portion at the upper end of the main-tube and having the end of its upward branch open and adapted to contain mercury and the intermediate tube filled with water or similar liquid, a float in said upward branch upon the surface of the mercury, and a registering device connected to be operated by said float.

5. In apparatus for registering variation in the level of bodies of liquid, a lever fulcrumed below the minimum level of the liquid to be registered, a float movably connected to one end of such lever and immersed in said liquid, a rod movably connected to the other end of said lever, a spring exerting upward movement to such rod, a bell-crank fulcrumed at its angle and having one arm connected to the rod, a traveling recording chart-frame having a sliding support, means for connecting said chart-frame and bell-crank, a vertically sliding rod carrying a writing device vertically slidable upon the chart, an adjustable bar having the end of the rod carrying the writing device resting upon it, a vertically movable rod having its end supporting the said bar, and means connected to slide said rod to raise and lower the same by rising and lowering of the levels of the liquid to be recorded.

6. Apparatus for registering variation in the level of bodies of liquid which consists of a tube for containing liquid adapted to have its lower end immersed in the liquid having its level changes registered, and having a U-shaped upper portion with an open end and adapted to receive a charge of mercury, a float controlled by the rise and fall of said mercury, and a writing device controlled by the movement of said float.

7. Apparatus for registering variation in the level of bodies of liquid which consists of a tube for containing liquid adapted to have its lower end immersed in the liquid having its level changes registered, and having a U-shaped upper portion with an open end and adapted to receive a charge of mercury, a float controlled by the rise and fall of said mercury, a writing device controlled by the movement of said float, a bolt at the upper end of said tube, and a valve for controlling the outlet of air from the tube.

FRANCIS M. CALDWELL.

Witnesses:
JOHN A. WIEDERSHEIM,
N. BUSSINGER.